(12) United States Patent
Andersson

(10) Patent No.: US 7,190,397 B2
(45) Date of Patent: Mar. 13, 2007

(54) CMOS IMAGER DECODER STRUCTURE

(75) Inventor: Anders Andersson, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 655 days.

(21) Appl. No.: 10/219,543

(22) Filed: Aug. 16, 2002

(65) Prior Publication Data

US 2004/0032520 A1    Feb. 19, 2004

(51) Int. Cl.
*H04N 5/335* (2006.01)
*H01L 31/062* (2006.01)
*H01L 27/00* (2006.01)

(52) U.S. Cl. ............ 348/302; 348/294; 348/308; 257/291; 250/280.1

(58) Field of Classification Search ............ None
See application file for complete search history.

(56) References Cited

U.S. PATENT DOCUMENTS

| 5,262,871 | A | * | 11/1993 | Wilder et al. ............ 348/308 |
| 5,541,654 | A | * | 7/1996 | Roberts ............ 348/302 |
| 5,668,485 | A | | 9/1997 | Rountree |
| 5,808,482 | A | | 9/1998 | Rountree |
| 6,047,352 | A | | 4/2000 | Lakhani et al. |
| 6,233,198 | B1 | | 5/2001 | Choi |
| 6,240,039 | B1 | | 5/2001 | Lee et al. |
| 6,365,886 | B1 | * | 4/2002 | Ang et al. ............ 348/308 |
| 6,400,639 | B1 | | 6/2002 | Ji et al. |
| 6,512,858 | B2 | * | 1/2003 | Lyon et al. ............ 250/553 |
| 6,515,701 | B2 | * | 2/2003 | Clark et al. ............ 348/308 |

OTHER PUBLICATIONS

Mark Horowitz, Lecture 3, Design Example—Memory, Especially Decoders, Copyright 2002, 11 pages.
Tadaaki Yamauchi, Lance Hammond, and Kunle Olukotun, The Hierarchial Multi-Bank DRAM; A High-Performance Architecture for Memory Integrated with Processors, Copyright 1997, 17 pages, Proceedings of the 17th Conference on Advanced Research in VLSI (ARVLSI '97).

* cited by examiner

*Primary Examiner*—David Ometz
*Assistant Examiner*—Nhan Tran
(74) *Attorney, Agent, or Firm*—Dickstein Shapiro LLP

(57) ABSTRACT

A decoder apparatus for selecting column lines of a CMOS imager pixel array is disclosed. The decoder apparatus is made up of at least one first decoder and at least one set of second decoders, each set being associated with respective first decoder. The first decoder decodes a first portion of an address representing a desired pixel array column and, depending on the results of the first decoding operation, selectively enables the associated second decoder set which decodes a second portion of the address to select a column line.

20 Claims, 4 Drawing Sheets

CMOS IMAGER DECODER STRUCTURE

FIELD OF THE INVENTION

The present invention relates generally to complementary metal oxide semiconductor (CMOS) imagers, and more particularly to a decoder apparatus for use with CMOS imagers.

BACKGROUND OF THE INVENTION

There are a number of different types of semiconductor based imagers, including charge coupled devices (CCDs), photodiode arrays, charge injection devices, hybrid focal arrays, etc. CCD technology is often employed for image acquisition and enjoys a number of advantages which makes it the preferred technology, particularly for small size imaging applications. CCDs are capable of large formats with small pixel size and they employ low noise charge domain processing techniques.

However, CCD imagers also suffer from a number of disadvantages. For example, they are susceptible to radiation damage, exhibit destructive readout over time, they require good light shielding to avoid image smear and they have a high power dissipation for large arrays. Additionally, while offering high performance, CCD arrays are difficult to integrate with CMOS processing in part due to a different processing technology and to their high capacitances, complicating the integration of on-chip drive and signal processing electronics with the CCD array. While there have been some attempts to integrate on-chip signal processing with CCD arrays, these attempts have not been entirely successful.

CCDs also must transfer an image by line charge transfers from pixel to pixel, requiring that the entire array be read out into a memory before individual pixels or groups of pixels can be accessed and processed. This takes a certain amount of time. CCD arrays may also suffer from incomplete charge transfer from pixel to pixel which results in image smear.

Because of the inherent limitations in CCD technology, there is an interest in complimentary metal oxide semiconductor (CMOS) imagers for possible use as low cost imaging devices. A fully compatible CMOS sensor technology enabling a higher level of integration of an image array with associated processing circuits would be beneficial to many digital applications such as, for example, in cameras, scanners, machine vision systems, vehicle navigation systems, video telephones, computer input devices, surveillance systems, auto focus systems, star trackers, motion detection systems, image stabilization systems and data compression systems for high-definition television.

Some of the advantages of CMOS imagers over CCD imagers are that CMOS imagers have a low voltage operation and low power consumption; CMOS imagers are compatible with integrated on-chip electronics (control logic and timing, image processing, and signal conditioning such as A/D conversion); CMOS imagers allow random access to the image data; and CMOS imagers have lower fabrication costs as compared with the conventional CCD because standard CMOS processing techniques can be used. Additionally, low power consumption is achieved for CMOS imagers because only one row of pixels at a time needs to be active during the readout and there is no charge transfer (and associated switching) from pixel to pixel during image acquisition. On-chip integration of electronics is particularly advantageous because of the potential to perform many signal conditioning functions in the digital domain (versus analog signal processing) as well as to achieve a reduction in system size and cost.

Among the challenges to employing CMOS for imager applications, is creating a structure which scales well but yet does not increase power consumption. One problem with conventional CMOS imagers is that pixel density cannot be increased on a CMOS chip without increasing power consumption due to increases in the size of the required decoder structure. A conventional approach to decoding an address space is to generate each address with an individual decoder. Consequently, as an address space increases, the decoder size increases as well since the number of bits requiring decoding increases. In the case of image sensors, the width of the decoder is fixed (decided by bit-size or number of pixels), and the only existing approach to add more bits into the decoder is to increase the decoder size which results in increases to the silicon area within which it can be implemented. Increases in silicon area brings with it increases in parasitic capacitance which results in slower circuits and increased power consumption. Consequently, a new approach to decoding an address space is needed for CMOS imagers to enable designers to increase address space while reducing power consumption and silicon area usage.

BRIEF SUMMARY OF THE INVENTION

A decoder apparatus for use with a CMOS imager pixel array is disclosed. The decoder apparatus is made up of at least one first decoder and a plurality of second decoders associated with each first decoder. The first decoder decodes a first portion of an address representing a desired pixel array column and, depending on the results of the first decoding operation, enables a subset of second decoders which decode a second portion of the address to select a particular column for pixel signal readout. Since only one subset of second decoders is enabled at a time power is reduced. In addition, the die area required to integrate the first and second decodes is less than the area required to integrate a single decoder for a given address size.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

Figure 1:
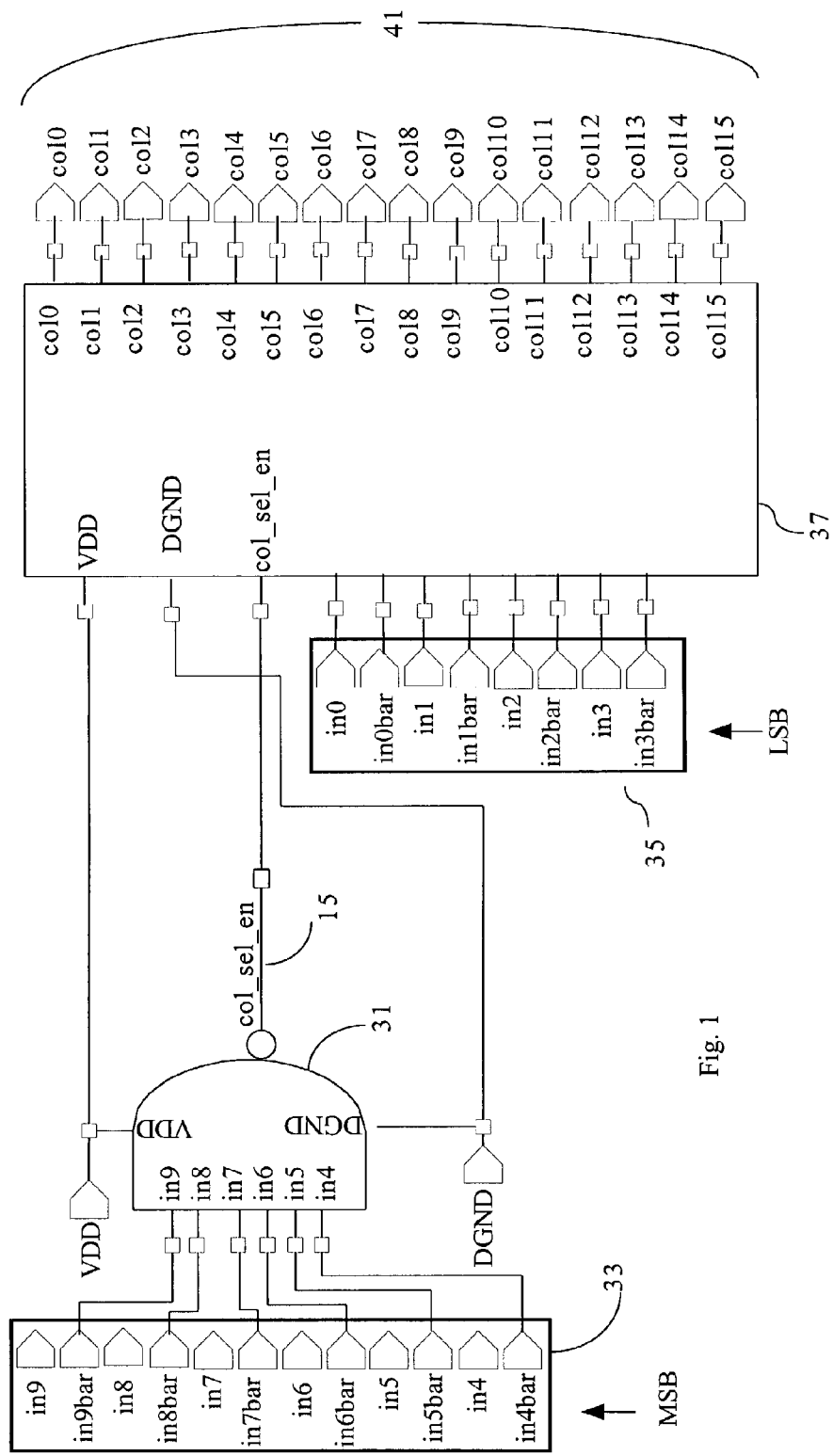
FIG. 1 shows a simplified block diagram of a decoder apparatus, in accordance with an exemplary embodiment of the invention.

FIG. 1 shows a simplified block diagram of a hierarchical decoder apparatus, in accordance with an exemplary embodiment of the invention. The hierarchical decoder apparatus decodes and enables the selection of an individual column address (co10 . . . co115) within a CMOS pixel array based upon its receiving a first plurality of bits representing the most significant bits (MSBs) of a desired column address at an input MSB address bus 33 and a second plurality of bits representing the least significant bits (LSBs) of the desired column address at an input LSB address bus 35.

The apparatus first decodes the MSBs of the desired column address at input bus 33 in a first MSB decoder 31 and, if the MSBs match the MSBs of pixel column addresses accessible by the decoder 31, then the apparatus enables a set of a second decoders 37 which decode the LSBs of the desired column address at input bus 35. The decoder set 37 contains a plurality of individual second decoders, one for each of the column lines col0 . . . col15. Thus, at first, only a first group of MSBs are decoded. Once the first group of MSBs are identified by MSV decoder 31, then the MSB decoder 31 enables the associate set 37 of LSB decoders for column selection. Once the LSBs are decoded, the desired pixel array column represented by the MSBs and LSBs may be accessed (for pixel signal read out).

In the implementation illustrated in FIG. 1, the decoder apparatus is coupled to a MSB bus 33 carrying six (6) MSBs of the 10 bit column address. These are bits 4–9 of the pixel column address. The first block select decoder 31 decodes the MSBs and determines whether the decoded MSBs match the MSBs for the group of column addresses accessible by decoder 31. If there is a match, the block select decoder 31 transmits a column enable signal to the decoder set 37 via signal line 15.

Figure 3:
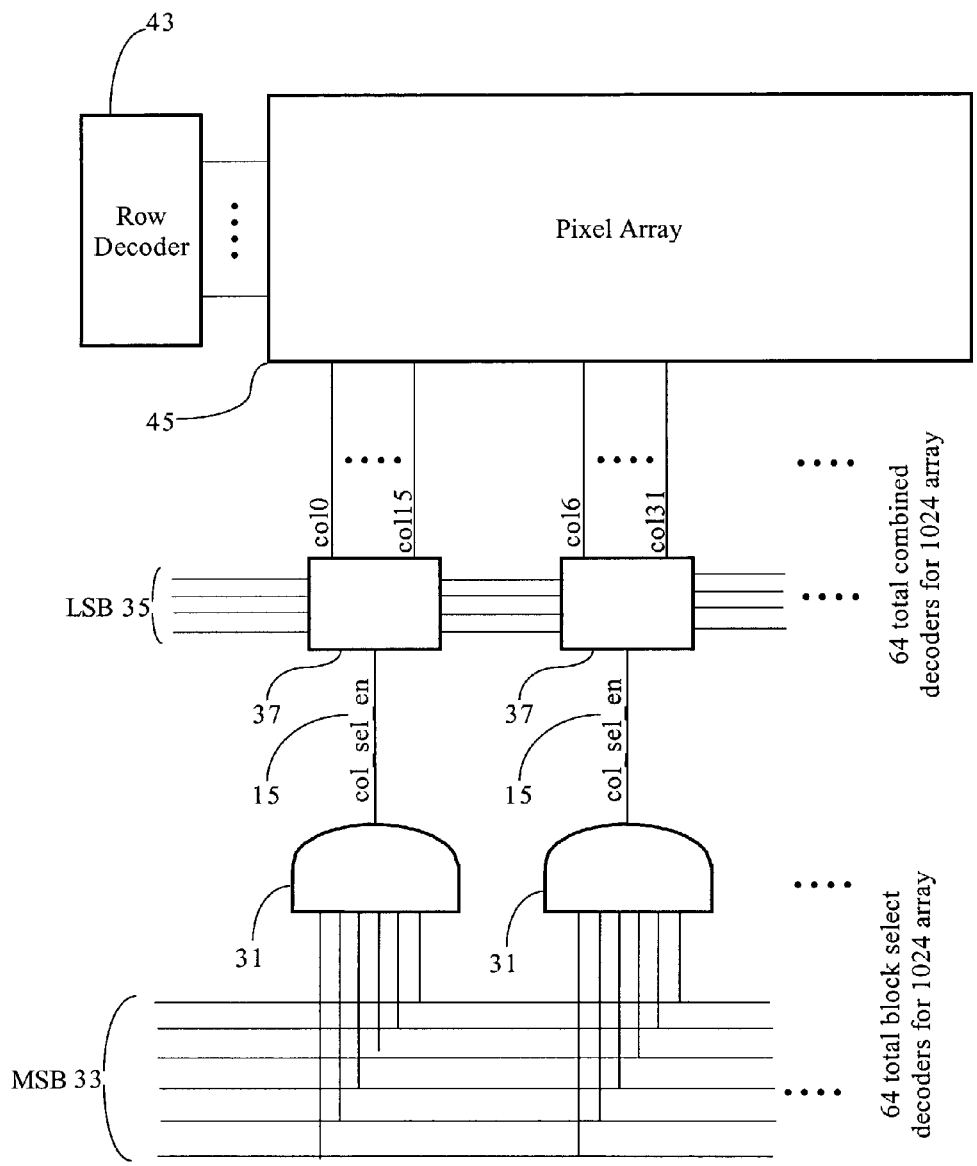
FIG. 3 shows a simplified block diagram of a portion of a CMOS imager pixel array coupled to the decoder apparatus of FIG. 1.

Upon receiving the column enable signal, the decoders of decoder set 37 decode the four (4) LSBs of the 10-bit column address received on LSB bus 35 and identifies one of the 16 column lines 41 (co10 . . . co115) accessible via enabled decoder set 37. Thereafter, the desired pixel array column line is accessed. For an address space of 1024 columns, the FIG. 1 decoder apparatus is replicated 64 times as depicted in FIG. 3 (64×16=1024). Thus each of the replicated decoder circuits of FIG. 1 is a block decoder which is able to decode one of the 16 column lines of that block.

Figure 2:
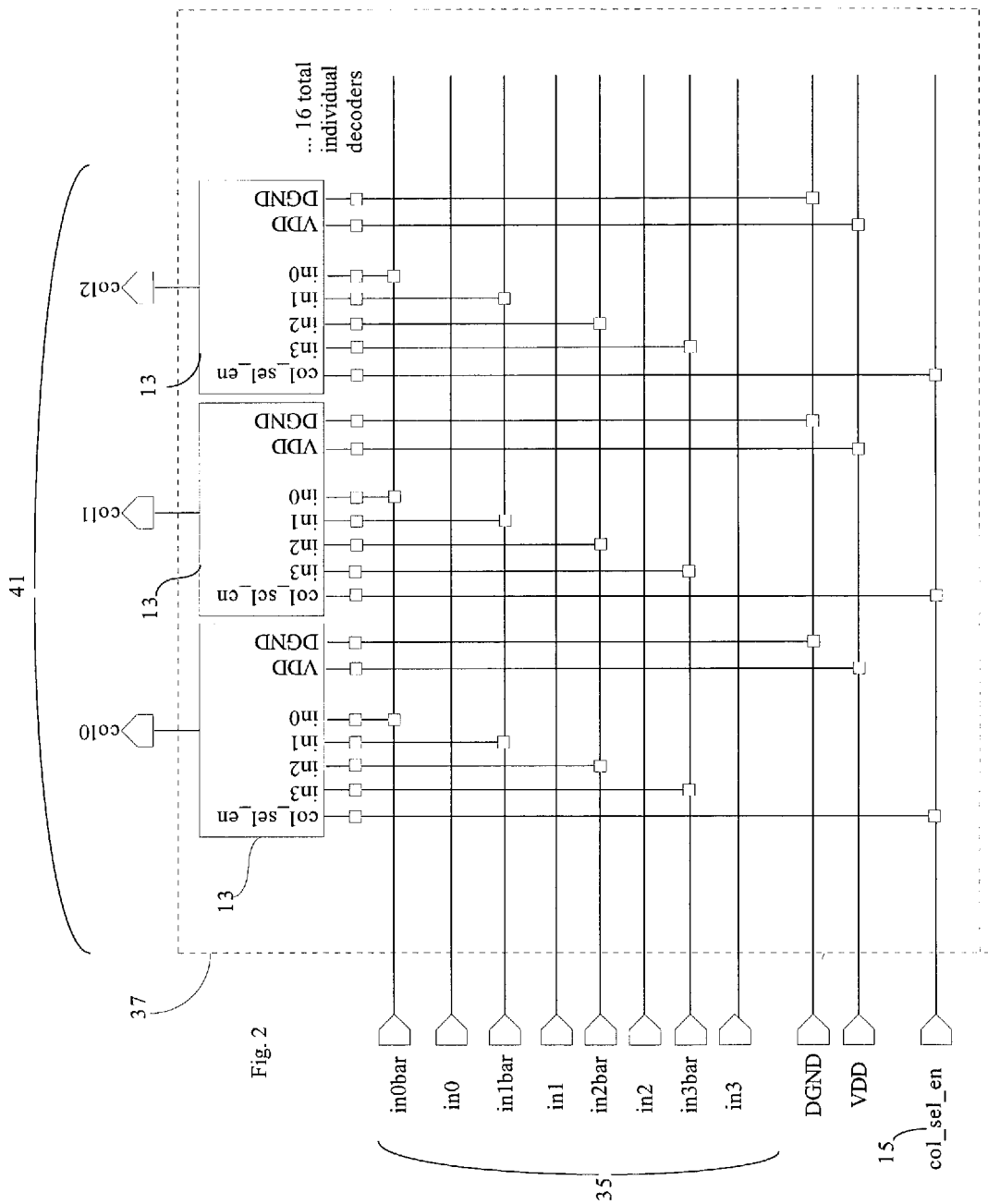
FIG. 2 shows a simplified block diagram of the combined decoder of the FIG. 1 decoder apparatus.

Turning to FIG. 2, a schematic diagram of the combined decoder set 37 is depicted. Decoder set 37 receives inputs from the LSB bus 35 and also receives the column enable signal from the block decoder (31 of FIG. 1) via signal line 15, as described above in connection with FIG. 1. Each input bit (e.g., bits 0–3) of the incoming LSBs of the desired column address is receivable by each individual decoder 13 within the decoder set 37. Further, each individual decoder 13 is configured to receive the column enable signal received by the combined decoder 37 via signal line 15. As a result, , when a column enable signal is present, the desired one of the 16 column lines (e.g., col0–col15) of the pixel array 45 (of FIG. 3) is activated and accessible. If the column enable signal is absent for a particular block, then the decoder set 37 for that block remains disabled, thereby reducing overall power consumption.

Referring again to FIG. 3, the replicated FIG. 1 decoder apparatus is coupled to a CMOS pixel array, in accordance with an exemplary embodiment of the invention. As described above, for an address space of 1024 columns, 64 FIG. 1 decoders are required. Each of the decoder sets 37 is coupled to 16 column lines of the pixel array 45. Each decoder set 37 is coupled to a respective block decoder 31. Each block decoder 31 receives the MSBs from the MSB bus 33 and for a given combination of MSBs, one of the block decoders 31 transmits a column select enable signal and transmits the same to its associated decoder set 37. Also depicted as being coupled to the pixel array 45 is a row decoder 43.

It should be noted that while a decoder apparatus for decoding a column address of a CMOS imager pixel array 45 has been described, pixel rows in a CMOS imager can also be selected one at a time using the FIG. 1–3 decoder apparatus.

Figure 4:
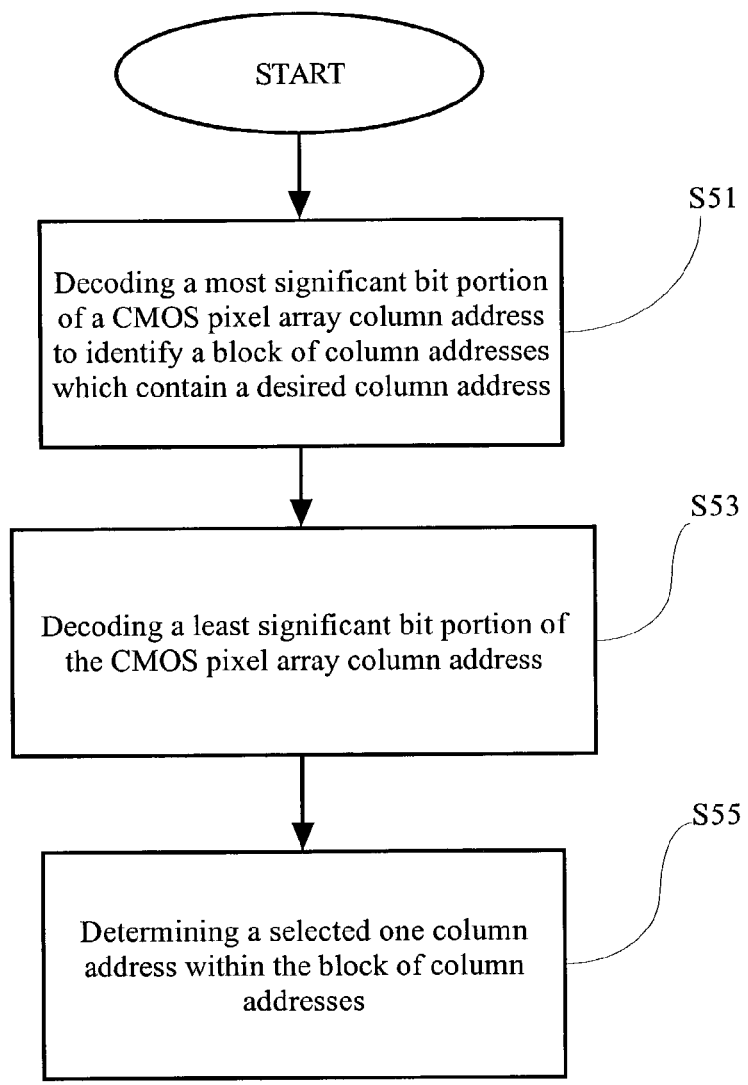
FIG. 4 shows a flowchart of the steps of a method for accessing an imager pixel array.

FIG. 4 shows, in flowchart form, the previously discussed method for accessing an imager pixel array. First, in step S51, a most significant bit portion of a CMOS pixel array column address is decoded to identify a block of column addresses which contain a desired column address. Next, in step S53, a least significant bit portion of the CMOS pixel array column address is decoded. Finally, in step S55, a selected one column address within the block of column address id determined.

The CMOS imager, including the decoder apparatus of the invention, may be manufactured using any known techniques available in the art and is not limited to the specific circuit schematic layouts described in connection with the figures. For example, although a specific number of column lines are depicted in the invention, such numbers are only for exemplary purposes and the invention is not limited thereto. Further, while a specific number of bits have been designated as the MSBs and LSBs of the column address, it should be readily apparent that any other number of bits can be selected as the MSBs and LSBs. Accordingly, the invention is not limited by the description above but is only limited by the scope of the appended claims.

The invention claimed is:

1. A decoder apparatus for use with an imager, the decoder apparatus comprising:
   at least one first decoder for decoding a first portion of an imager pixel line address;
   a plurality of subsets of second decoders, each of said second decoders of a subset being collectively enabled by an output of a respective first decoder, said enabled subset of second decoders being operable to decode a second portion of said imager pixel line address such that a desired line of said imager can be accessed, each of said second decoders of a subset being associated with a plurality of imager pixel lines,
   wherein said first decoder is configured to disable all other subsets of second decoders responsive to enablement of any one of said plurality of subsets of second decoders.

2. A decoder apparatus of claim 1 wherein said desired line is a column line.

3. A decoder apparatus of claim 1 wherein said desired line is a row line.

4. The apparatus of claim 1 further comprising:
   an imager-pixel array comprising a plurality of column lines coupled to said decoder apparatus, wherein a desired column line is capable of being selected by one of the decoders of an enabled subset of second decoders.

5. The decoder apparatus of claim 1 wherein said first decoder is operable to decode a first plurality of bits of a line address.

6. The decoder apparatus of claim 5 wherein said enabled subset of second decoders is operable to decode a second plurality of bits of said line address.

7. The decoder apparatus of claim 5 wherein said first plurality of bits comprise most significant bits of said line address.

8. The decoder of claim 6, wherein said second plurality of bits comprises least significant bits of said line address.

9. The decoder apparatus of claim 7 wherein said at least one first decoder is operable to generate a column select enable signal when a value represented by said plurality of most significant bits matches at least one predetermined value, and wherein said at least one first decoder is operable to transmit said column select enable signal to said subset of second decoders to enable said subset of second decoders to decode the remaining bits of said imager pixel line address.

10. The decoder apparatus of claim 4, wherein said subset of said second decoders is coupled to N column lines of said imager pixel array where N is an integer greater than one.

11. The decoder apparatus of claim 10 wherein N =16.

12. The decoder apparatus of claim 1, wherein said imager is a CMOS imager.

13. A decoder apparatus for use with a pixel array, said decoder apparatus comprising:

a plurality of first decoders for decoding a plurality of most significant bits of a column line address of said pixel array, wherein one of said first decoders is operable to generate a column select enable signal when a value represented by said plurality of most significant bits matches a predetermined value representing a group of column line addresses accessible via said one first decoder; and a plurality of sets of second decoders, each set being associated with a respective first decoder, each set being operable to receive a respective column select enable signal from a respective first decoder and to decode a plurality of least significant bits of said column line address when said column select enable signal is received;

wherein said first decoder is configured to disable all other subsets of second decoders responsive to enablement of any one of said plurality of subsets of second decoders; and a plurality of pixel signal column lines, one of which is operable to be selected by an individual decoder receiving a column select enable signal and in response to said individual decoder decoding a plurality of least significant bits of said line addresses, each of said second decoders of a set being associated with a plurality of said column lines.

14. The decoder apparatus of claim 13, wherein said pixel array is a CMOS pixel array.

15. A method for accessing an imager pixel array, the method comprising:

decoding a first portion of an imager pixel line address, comprising:

receiving said first plurality of bits of said imager pixel line address at a first decoder; and determining whether a value represented by said first plurality of bits matches at least one predetermined value representing a group of lines accessible via said first decoder;

decoding a second portion of said imager pixel column address in response to a decode enable signal generated by the decoding of said first portion of said address, comprising:

identifying a match between said value represented by said first plurality of bits and said at least one predetermined value; and generating an enable signal at said first decoder and transmitting said enable signal to one of a plurality of sets of second decoders, said enable signal enabling said one of said plurality of sets of second decoders to perform said decoding a second portion and disabling all other sets of said plurality of sets of second decoders; and selecting one of a plurality of column lines of said imager pixel array, said selected one column line being represented by said first and second portions of said imager pixel line address.

16. The method of claim 15, wherein said decoding a first portion comprises:

decoding a plurality of most significant bits of said imager pixel line address.

17. The method of claim 16, wherein said decoding a second portion comprises:

decoding a plurality of least significant bits of said imager pixel line address.

18. The method of claim 15, wherein said imager pixel array is a CMOS pixel array.

19. A method for accessing a column of imager pixel array, the method comprising:

decoding, at a first decoder, a plurality of most significant bits of a desired imager pixel line address to determine whether said desired line address is accessible via said first decoder;

detecting that said desired line address is accessible via said first decoder;

decoding a plurality of least significant bits of said desired line address to identify the desired line; and enabling access to said desired line by enabling one of a plurality of sets of second decoders and deactivating all other sets of said plurality of sets of second decoders.

20. The method of claim 19, wherein said imager pixel array is a CMOS pixel array.

* * * * *

UNITED STATES PATENT AND TRADEMARK OFFICE
CERTIFICATE OF CORRECTION

PATENT NO. : 7,190,397 B2
APPLICATION NO. : 10/219543
DATED : March 13, 2007
INVENTOR(S) : Anders Andersson It is certified that error appears in the above-identified patent and that said Letters Patent is hereby corrected as shown below:

Column 1, line 42, "complimentary" should read --complementary--;

Column 2, line 39, "decodes" should read --decoders--;

Column 3, line 41, "(co10 . . . co115)" should read --(col 0 . . . col. 15)--;

Column 3, line 59, "result,," should read --result,--; and

Column 4, line 24, "id" should read --is--.

Signed and Sealed this

Twenty-first Day of August, 2007

JON W. DUDAS
*Director of the United States Patent and Trademark Office*